Sept. 8, 1970 B. T. HENSGEN 3,527,083
WEIGHT CONTROL OF SLICED BACON

Filed Nov. 14, 1966 2 Sheets-Sheet 1

INVENTOR.
BERNARD T. HENSGEN
BY E. T. McCabe
ATTORNEY

INVENTOR.
BERNARD T. HENSGEN
BY E. T. McCabe
ATTORNEY.

United States Patent Office 3,527,083
Patented Sept. 8, 1970

3,527,083
WEIGHT CONTROL OF SLICED BACON
Bernard T. Hensgen, Highland Park, Ill., assignor to Swift & Company, Chicago, Ill., a corporation of Illinois
Filed Nov. 14, 1966, Ser. No. 593,933
Int. Cl. G01n 9/02
U.S. Cl. 73—32
8 Claims

ABSTRACT OF THE DISCLOSURE

Methods of designating optimum number and thickness of product slices to be taken from block of food material (bacon) to make up drafts of desired weight as function of cross-sectional area and density of said food block. Apparatus includes means for measuring cross-sectional area of food block, means for determining density of food block, and indicating and control means operable to designate desired number of slices and desired thickness of slices to be cut from said block as function of block cross-sectional area and block density.

This invention relates to an improved method and apparatus useful in the production of substantially uniform weight drafts of sliced food product from blocks of deformable food product having varying dimensions and/or densities. More particularly, the invention is directed to an improved method and apparatus for designating the number of slices required for a draft, and the thickness of such slices to be cut from a given block of food material such as bacon.

While the present invention is usable in numerous applications it has been found to be particularly suitable for use in bacon slicing preferably where the bacon is pressed immediately prior to being sliced as disclosed in my prior U.S. Pat. No. 3,285,161 (Clemens and Hensgen—Nov. 15, 1966), the present invention illustrates such a use; however, it will be obvious that the invention may be advantageously employed in slicing other food products.

In general, bacon slicing machines compirse a horizontal bed, a rotatable knife means disposed perpendicular to the bed for slicing material thereon, and a feed carriage movable along the bed in a path at a right angle to the plane of the knife. The feed carriage is usually actuated by a hydraulic piston and cylinder and the rate of advance of the carriage depends upon the amount of fluid introduced into the cylinder to displace the piston. Thus, a flow valve located in the hydraulic line has been used to control the rate of feed. Usually, the knife severs one slice each revolution and it clearly follows that the thickness of each slice will be dependent upon the speed of the knife and the rate of feed. Preferably, the knife speed is maintained constant during operation and the slice thickness is controlled by adjusting the rate of feed. An increase in the rate of feed will result in a relative increase in the thickness of the slices and may be obtained by increasing the rate at which fluid is introduced into the cylinder. Slices may be grouped by either interrupting the advance of the feed carriage or momentarily accelerating the speed of a take-off conveyor.

It is conventional to "press" bacon bellies, that is to flatten and form sides of bacon into the configuration of rectangular blocks so that after the blocks are processed in a slicing machine, the resulting slices are substantially uniform in shape and thickness. Due to the fact that the sides vary in size and weight, it has previously been necessary, for the reasons given below, to first weigh and sort the slabs into various weight ranges to facilitate the subsequent slicing operation. The thicker, heavier slabs of bacon have a larger cross-sectional area compared to lighter slabs and will, if slice thickness is unchanged, result in a different number of slices per draft of given weight. These thicker, heavier slabs also generally have a lower density than lighter slabs, as they usually contain a larger proportion of fat which is of lower density than the lean portion. Various slice thickness control systems, responsive to variations in slab dimensions, for producing slices of constant volume are known, but these systems do not compensate for varying densities. Previously, it has been common practice for an experienced operator to attempt to estimate the number of slices required to make up the desired weight drafts from each slab. The uniformity of the package weight under this procedure is dependent upon the operator's skill and experience in estimating the desired number of slices.

Therefore, it is an object of the invention to provide an improved method and apparatus for designating the number of slices and thickness of such slices, to be produced from a given block of food product, per draft of sliced product.

A further object of the invention is to provide an improved method and apparatus to determine and control the number of slices and the thickness of such slices necessary to produce desired weight drafts of sliced food product from rectangular blocks of food product of varying size and density.

Generally, the method of the invention involves weighing a block of the deformable food product, pressing the block into a rectangular shape, measuring the dimensions of the pressed block, producing a signal representing the ratio of weight of the block relative to the volume of the block, producing another signal representing the cross-sectional area of the block in a plane parallel to the plane on which the block is to be cut, and translating the latter signals into cumulative movements to indicate optimum number of slices and the thickness of the slices as a function of the approximate number and the weight-volume ratio. These movements may also be transmitted as an electrical signal and used to control the operation of a slicing machine.

The apparatus of the invention includes compressing means for forming a block of deformable food product into a rectangular shape, a plurality of measuring means for generating signals proportional to the dimensions of the rectangularly shaped block, weighing means for determining the mass of the block prior to slicing, computing means for computing the cross-sectional area and the density of the block, and indicating and control means operably connected to the computing means for indicating the number of slices per draft as a function of the cross-sectional area of the block of food product and for indicating the desired thickness of the slices in the drafts as a function of the cross-sectional area and the density of the block. The indicating and control means may also be connected to a food product slicing machine to automatically control the slicing machine. Preferably the aforementioned means are electrical; however, it will be apparent to those skilled in the art that equivalent pneumatic and mechanical elements may also be employed.

Further objects and advantages of the invention will become apparent from reading the following detailed specification in conjunction with the drawings wherein.

The method of the invention contemplates measuring physical characteristics of individual blocks of food product and the use of this information to designate or control the optimum number of slices per draft to be cut from each block, and also the relative thickness of such individual slices. The physical characteristics which are measured include the dimensions of a block after it has been formed into a rectangular shape and also the weight (mass) of the block. Each measurement is converted into a signal. A first major signal representing weight is retained until pressing of the slab is complete. Then measurement signals representing the three rectilineal dimensions are produced and combined to produce a second major signal proportional to slab volume; and two measurement signals are combined to produce a third signal representing cross-section.

Thereafter the volume signal is divided by the retained weight signal, resulting in a further signal proportional to slab density. This signal and the third signal, representing cross-section, are then translated into cumulative movements of an indicating device so as to tend to drive the indication of slice number per draft inversely to the signals, that is the number of slices per draft will be designated higher for decreases in both or either cross-section and density of slab, and vice versa. Also the relative thickness of slices will be designated in the same general order within intervals representing single slice changes. That is where the cumulative movements of the indicator are on the low side of a given slice number designation the slices should be relatively thin; while at the high side the slices should be relatively thick, as compared to a normal slice thickness at midrange.

It will be apparent to those skilled in the art that the indicator movements, or the signals producing those movements, may be impressed upon slicing machine controls to regulate the slicing operation; and this may be done either manually or automatically.

The method and apparatus of the present invention are particularly useful in conjunction with a slicing machine including grouping means for separating slices of product into drafts containing a variable desired number of slices and slice-thickness control means for varying the thickness of individual slices. Such slicing machines also include a planar cutting means and feed means, usually hydraulic, for moving blocks of product toward the cutting means. The patent to Reichel et al., U.S. Pat. No. 3,133,574, teaches such a slicing machine and the disclosure of that patent is incorporated herein by reference. However, it is to be understood that the present method and apparatus could be used with a slicing machine having any combination of the known grouping means, such as grouping means which interrupt the advance of the feed carriage or accelerate the speed of the take-off conveyor, with various known slice-thickness control means, such as variable speed feed means.

Figure 1:
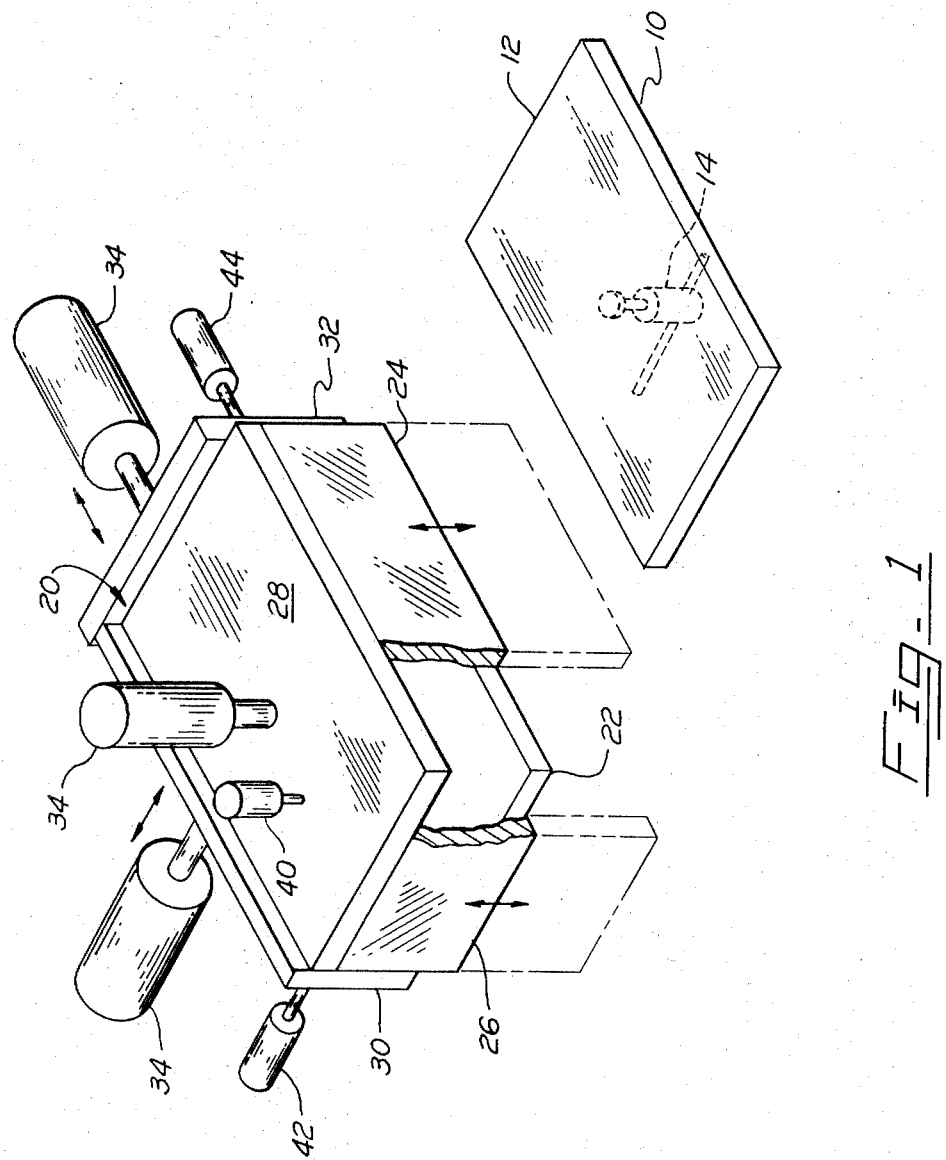
FIG. 1 is a perspective view of elements included in one embodiment of the invention.
Figure 2:
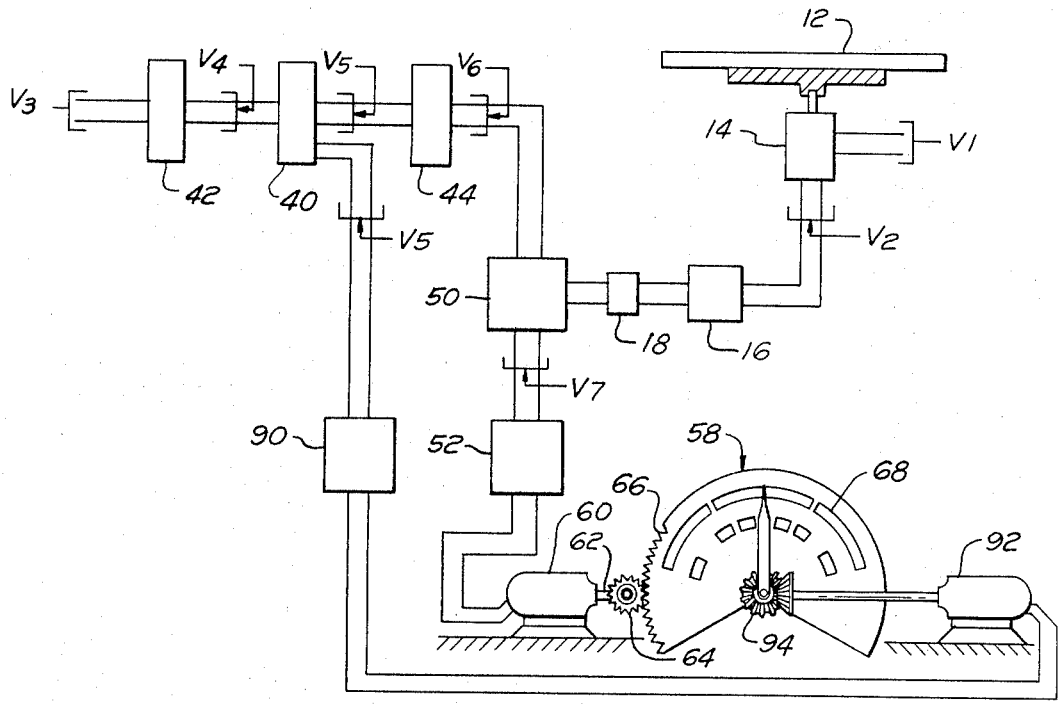
FIG. 2 is a schematic layout of the electrical system of the embodiment of FIG. 1.

The apparatus illustrated in FIGS. 1 and 2 includes weighing means, generally 10, including a platform 12 for supporting a block of product and a load cell 14 which has a constant input voltage $V_1$ and a variable output voltage $V_2$, which is a function of the weight of a block of product material. Voltage $V_2$ may be amplified by an amplifier 16 and held in a memory unit 18.

A pressing means, generally 20, is adapted to form blocks of irregularly shaped deformable food products, such as bacon slabs, into a rectangular parallelepiped shape. The pressing means is of the type having a cavity defined by six sides of which three mutually adjacent sides are movable respecting three opposite stationary sides to compress the slabs. In FIG. 1 a stationary bottom member 22 for supporting a block of food product and a pair of adjacent side members 24 and 26 (which may be vertically reciprocable relative to the bottom member 22 for ease of placing bacon slabs on the bottom member) are the relatively stationary members. Three hydraulically operated platens, top platen 28, side platen 30, and end platen 32, are spaced apart from and in parallel relationship with bottom member 22 and side members 24 and 26, respectively. Each platen is reciprocable along an axis perpendicular to its respectively spaced member.

Power means comprising hydraulic cylinders 34, a motor-driven hydraulic pump (not shown) and a control system (not shown) reciprocate the platens. During movement of the platens toward their respective spaced members, compressive force surrounds a block of deformable food product positioned on the bottom member which results in pressing the block into a rectangular shape. It is to be understood that the particular construction of the power means involves no part of the present invention and that various equivalents thereof are adaptable for use in the invention, including mechanical or electrically powered drives.

Measuring means comprising spring-loaded potentiometers 40, 42, and 44 are mounted on platens 28, 30, and 32, respectively. These potentiometers measure the dimensions of the pressed rectangular slab after the platens have ceased their compressive movement toward their respective spaced members 22, 24, and 26.

It is to be understood that an operator or any convenient conveying means may be used with the invention for moving a slab of food product from the weighing means to the pressing means or vice versa. Also, similar arrangements may be used to transfer a block of food product to the feed means commonly associated with presently available slicing machines. An apparatus provided with mechanical means for such manipulations is shown in the previously mentioned U.S. Pat. 3,285,161.

The operating sequence of the above-described portion of the apparatus is outlined below. An unpressed slab of bacon is positioned on the platform 12 and the load cell 14 registers its weight as a voltage $V_2$. This voltage is then amplified by the amplifier 16 and is held in the memory unit 18. Secondly, the unpressed slab is placed onto the stationary bottom member 22 of the pressing means, generally 20. The side members 24 and 26 are in a retracted position to allow the bacon belly to be easily placed onto the bottom member 22. Side members 24 and 26 are then raised into position to form sides of the pressing means. A hydraulic cylinder 34 is activated to force the platen 30 to press against the bacon slab. Suitably mounted on platen 30 is a spring-loaded potentiometer 42 which records the width of the bacon slab as a voltage when platen 30 comes to rest. Then platen 28 is forced down on top of the bacon slab. Mounted on platen 28 is a potentiometer 40 which records the thickness of the bacon slab as a voltage when platen 28 comes to rest. Lastly, platen 32 is forced against the bacon slab completing the pressing operation. Mounted on platen 32 is potentiometer 44, which records the length of the bacon slab as a voltage when platen 32 comes to rest.

The measuring means are positioned so that the dimensions of the sides of the rectangular block of food product are measured. In feeding the block of material to a slicing machine, the side of the block adjacent side member 26 is maintained parallel to the cutting plane.

Referring to FIG. 2, a computing means for determining the cross-sectional area and density of individual blocks and for generating electrical signals proportional thereto is illustrated. A constant voltage $V_3$, from a source, not shown, is introduced into the potentiometer 42 connected to the side platen 30. The output voltage $V_4$ of the potentiometer 42, which is proportional to slab width, is then directed into potentiometer 40. Since the potentiometer 40 is connected to the top platen 28, the output $V_5$ 40 will be proportional to cross-sectional area and is directed into potentiometer 44 connected to the end platen 32. The output $V_6$ of potentiometer 44 will then be proportional to volume of the slab, and is then channelled into a dividing device, such as an analogue computer circuit wherein it is divided by the weight signal $V_2$ which is being held in memory unit 18. Thus, $V_6$ is proportional to volume; $V_2$ is proportional to weight; and, $V_6/V_2$ is a volume-to-weight ratio, and is proportional to $V_7$, the output from the computer circuit, which is amplified by an amplifier 52 and is fed to an indicating and control means, generally 58.

Figure 3:
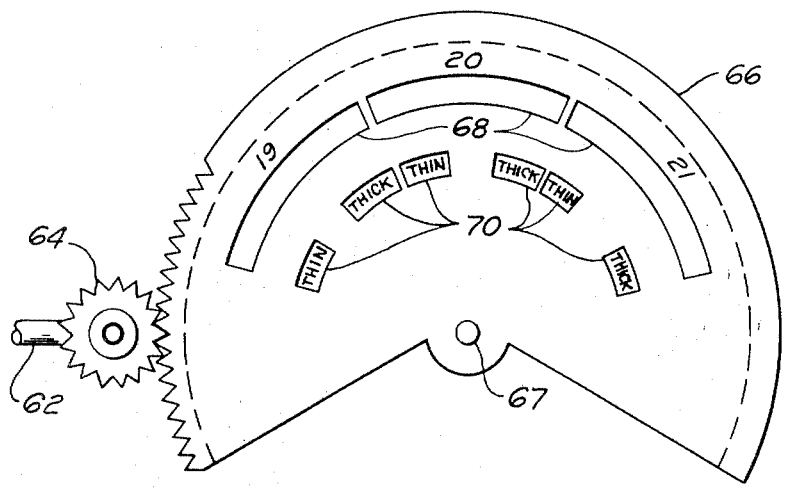
FIG. 3 is an enlarged elevational view of a portion of the apparatus illustrated in FIG. 2.

The indicating and control means 58 includes a servo-motor 60 which receives the amplified voltage signal $V_7$ and rotates a shaft 62 which terminates in a bevel gear 64 meshing with a beveled portion of a commutator plate 66. The commutator plate 66 is mounted for rotation about a shaft 67. The servo-motor and gearing are selected to rotate the commutator plate clockwise for increasing signals above a median level and vice versa. The commutator plate is shown in detail in FIG. 3 and includes an outer set of electrical contacts 68 and an inner set of electrical contacts 70 concentric to the shaft 67. Both sets of contacts are calibrated to also serve as a scale member of the dial indicator type. The plate body 66 is preferably manufactured from a non-conductive material such as nylon which can be machined to form a beveled track mating with the gear 64.

The outer electrical contacts are distinct but nearly contiguous and are of sufficient number to represent the usual range of slices desired to produce a unit of product. For example, a pound of bacon usually requires 19 to 21 slices depending on the slab from which cut. These contacts represent increases in a clockwise direction.

The inner electrical contacts 70 occur in pairs, each pair positional within the angular segment embraced by a corresponding outer contact 68, and spaced so as to correspond only to the extreme sides of each segment with the central portion thereof left blank. These inner contacts represent increases, in a clockwise direction, of slice thickness from below normal, or "thin," to above normal, or "thick," slices.

The voltage signal $V_5$ proportional to the cross-sectional area of a block of food product in the cutting plane, is also taken directly from potentiometer 40 through an amplifier 90 and fed into a servo-motor 92 which is also part of the indicating and control means 58. A pointer 94 is operatively connected to the servo-motor 92, by gearing, for rotation about the shaft 67 so that a visual indication of the number and thickness of slices is provided. The pointer 94 is driven to be rotated counterclockwise with increased signals $V_5$ above an established level.

Thus the movements of both the commutator plate 66 and the pointer 94 are cumulative to designate decreasing number of slices and/or thickness with increases in both cross-sectional area and density of the measured slab.

An operator may manually control a slicing machine to conform with the slice information thus designated. Also the electrical contacts 68 and 70 may be wired so as to provide alternate electrical paths to slicer control apparatus. The latter would involve the pointer 94 as a brush type contact member connected to the slicer control apparatus circuit power supply or ground; and the outer contacts 68 connected to a slice counter and feed control. The "thick" and "thin" elements of contacts 70 would be coupled with like elements and with a double acting solenoid and a three-way valve, not shown, in the feed power system.

Obviously many modifications and variations of the invention as hereinbefore set forth may be made without departing from the spirit and scope thereof, and therefore only such limitations should be imposed as are indicated in the appended claims.

I claim:
1. An improved method for designating the number and relative thickness of cross-sectional slices to be taken from a block of food material to make up drafts of desired weight, said method comprising: weighing the block of material and producing a first signal representing the weight; measuring three rectilinear dimensions of said block and producing signals from the measurements; combining all of the measurement signals to produce a second signal representing the volume of said block; combining two of the measurement signals to produce a third signal representing the cross-sectional area of said block; producing a further signal from said first and second signals, said further signal being a function of the density of said block of material; and translating both said third and said further signals to cumulative relative motions so as to tend to adjust slice number and thickness designations in inverse relation to said signals.

2. The method of claim 1 wherein all of said signals are electrical.

3. The method of claim 1 wherein slices are cut from a block of bacon in accordance with the resultant slice number and thickness designations.

4. The method of claim 3 wherein said designations are fed automatically to a slicing machine.

5. An apparatus for determining and designating a desired number of slices and desired relative thickness of slices to be cut from a substantially rectangular block of food product and to be grouped into uniform weight drafts, said apparatus comprising: weighing means for generating a first signal proportional to the weight of said block; a plurality of measuring means for detecting the length, width and height of said rectangularly shaped block, said means adapted to produce signals from the measurement of each dimension; means to combine all of the measurement signals to produce a second signal representing volume of said block; means to combine the measurement signals representing height and width to produce a third signal representing cross-sectional area of said block; means to combine said first and second signals to produce a further signal representing density of said block; indicating and control means for indicating a desired number of slices and a desired thickness of slices to be cut from said block as a function of the cross-sectional area and density of said block, said indicating and control means including two members, each being movable in relation to the other, one of said members being a calibrated rotatable plate operable to be moved in accordance with said density signal and the other of said members being a rotatable pointer operable to be moved in accordance with said cross-sectional area signal, said members cooperating to visually exhibit said desired number and said desired thickness.

6. The apparatus of claim 5 wherein said means to combine said first and second signals is connected to said rotatable plate by a first servo-motor, and said means to combine two of the measurement signals is connected to said pointer by a second servo-motor, and both said plate and pointer are rotatable on a common shaft, whereby said rotatable plate is driven about said shaft by said first servo-motor in one direction upon generation of a relatively increased density signal and said pointer is rotatably driven about said shaft by said second servo-motor in an opposite direction upon a signal indicating a relatively increased cross-sectional area.

7. The apparatus of claim 6 wherein the measuring means includes three spring-biased potentiometers mounted on the movable platens of a slab press to measure the dimensions of a block of bacon after termination of compressive movement of said platens.

8. The apparatus of claim 6 wherein said rotatable plate is of a non-conductive material bearing electrical contacts corresponding to slice number and relative thickness calibrations, and said pointer includes an electrical conductive portion contactable with said electrical contacts.

References Cited

UNITED STATES PATENTS 3,105,533 10/1963 Hensgen et al. _____ 146—241
3,133,574  5/1964 Reichel et al. _____ 146—241

RICHARD C. QUEISSER, Primary Examiner

J. K. LUNSFORD, Assistant Examiner

U.S. Cl. X.R.

146—241